United States Patent
Dyer et al.

(10) Patent No.: US 6,321,527 B1
(45) Date of Patent: Nov. 27, 2001

(54) BI-LEVEL FUEL PRESSURIZING SYSTEM

(75) Inventors: Gerald P Dyer, Enfield; Timothy P Lenihan, Granby, both of CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 09/360,823

(22) Filed: Jul. 26, 1999

Related U.S. Application Data (63) Continuation-in-part of application No. 09/004,556, filed on Jan. 8, 1998, now abandoned.

(51) Int. Cl.[7] .................................................. F02C 9/26
(52) U.S. Cl. ................................................. 60/39.281
(58) Field of Search ................................. 60/39.281, 734; 137/486, 505.14

(56) References Cited

U.S. PATENT DOCUMENTS

| | | | |
|---|---|---|---|
| 3,521,446 | 7/1970 | Maljanian | 60/39.16 |
| 3,699,774 | 10/1972 | Davis et al. | 60/39.28 |
| 3,808,798 | 5/1974 | Tahlor | 60/39.28 |
| 4,220,000 | 9/1980 | Lewis | 60/39.28 |
| 4,411,133 | 10/1983 | Stearns et al. | 60/39.281 |
| 4,493,187 | 1/1985 | Hansen | 60/39.281 |
| 4,602,479 | 7/1986 | Hansen | 60/39.281 |
| 4,760,662 | 8/1988 | Dyer et al. | 60/39.281 |
| 4,760,696 | 8/1988 | Rooks et al. | 60/39.281 |
| 4,805,658 | 2/1989 | Perkinson et al. | 137/81.1 |
| 4,817,376 | 4/1989 | Brocard et al. | 60/39.281 |
| 4,837,697 | 6/1989 | Eisa et al. | 60/39.281 |
| 5,086,617 | 2/1992 | Smith | 60/39.281 |
| 5,209,058 | 5/1993 | Sparks et al. | 60/39.281 |
| 5,448,882 | 9/1995 | Dyer et al. | 60/39.281 |
| 5,501,245 | 3/1996 | Lechevalier | 60/39.281 |
| 5,579,632 | 12/1996 | Dutka et al. | 60/39.281 |
| 5,692,537 | * 12/1997 | Arian et al. | 137/486 |

* cited by examiner

Primary Examiner—Louis J. Casaregola (57) ABSTRACT

According to the present invention, a fuel delivery system having a fuel pump for providing an unregulated flow of fuel at a pressure and a metering valve receiving the unregulated flow of fuel and providing a regulated flow of fuel consists of a bi-level hydraulic pressurization system for controlling the output pressure of a fuel supply which includes a pressure regulating valve for maintaining a constant pressure differential across the metering valve by bypassing unregulated fuel from the metering valve input to the pump inlet. The pressurization valve controls the pressure of the regulated fuel output to the engine and is responsive to a signal indicative of an excess flow of unregulated fuel to control the fuel output to a first set point when the excess flow of unregulated fuel is less than a predetermined value and to a second set point when the excess flow of fuel is greater than the predetermined value.

4 Claims, 7 Drawing Sheets

BI-LEVEL FUEL PRESSURIZING SYSTEM

This is a continuation-in-part of application Ser. No. 09/004,556, filed Jan. 8, 1998 (abandoned).

TECHNICAL FIELD

This invention relates to the control of hydraulic fluid and more particularly to fuel delivery systems for aircraft gas turbine systems.

BACKGROUND ART

It is well known in the art of fuel delivery systems for aircraft gas turbine engines to use a fixed positive displacement pump, such as a vane or gear pump, to pressurize fuel for subsequent delivery to the engine. The fixed positive displacement pump provides a flow whose volume is a function of the speed at which the pump is rotating. The relation of the change in volumetric output for a change in speed is linear in nature.

The demand for fuel increases as the speed of the turbine increases, although when measured as a function of the percentage of pump output, demand for fuel is greatest at either low speeds (engine start) or at high speeds (take-off). Therefore, in order to provide the desired flow of fuel to the turbine during normal flight operation, the excess fuel output from the fixed positive displacement pump must be bypassed from the fuel control back to the input of the fixed positive displacement pump or to a fuel reservoir.

The positive displacement pump must be sized to ensure an excess flow capacity at all possible operating conditions. Therefore, the pump must be sized for either low speed start conditions, or high speed takeoff conditions.

The speed for greatest fuel demand is unique to each engine and is a function of the minimum starting speed. For engine applications where the pump has been sized, based on start speed, there will be an excess amount of fuel available at higher speeds.

Today's aircraft manufacturers are moving toward lower engine starting speeds, which tend to drive pump design requirements. As discussed above, sizing pumps for low speed condition generally results in large amounts of bypassed (unused) fuel at higher speed engine operating conditions. This bypassed fuel is continually recirculated and results in significant fuel heating.

With the latest fuel efficient engine designs, excessive fuel heating becomes a serious problem. The increase fuel temperature requires the addition of fuel/oil coolers. Air is also used to reduce fluid temperatures. These devices increase the cost, weight, and fuel burn of the engine.

It is typical in fuel supply systems for aircraft to control the flow of fuel to the engine through the use of a metering valve in conjunction with a pressure regulating valve.

Operation of the metering valve and the pressure regulating valve is based upon incompressible flow theory which states that flow through a valve is a function of the area of the valve opening multiplied by the square root of the product of the pressure drop across the valve multiplied by the specific gravity of the fluid. The pressure regulating valve controls pressure drop across the metering valve and compensates for temperature variations in the fuel, and therefore the flow though the metering valve can be precisely controlled by varying the area of the opening of the metering valve window.

As stated above the pump is sized to provide excess fuel flow for all engine operating conditions. The excess fuel flow is bypassed from the metering valve inlet, by the pressure regulating valve, back to the pump inlet. To achieve a desired increase in engine speed, an electronic controller will increase the area of the metering valve window to set a desired flow of fuel to the engine. As the metering valve window increases, the flow of fuel to the engine increases and the amount of fuel bypassed by the pressure regulating decreases. As the flow of fuel to the engine increases, the speed of the engine will increase which in turn drives the positive displacement pump at an increased speed. The increase in pump speed increases the flow of fuel which will cause a rise in the pressure differential across the metering valve. The pressure regulating valve will then bypass a portion of the excess fuel output from the positive displacement pump to maintain the desired pressure differential across the metering valve.

In addition to the fuel required by the engine, the pump also provides a fuel flow having a minimum pressure which is a function of the fuel delivery system hardware. The pressurized fuel is used as a working fluid to position valves within the fuel control. Therefore, the fuel must be maintained at sufficient pressure to position the valves (force margin) and furthermore must have sufficient pressure to actuate the valves within a required response time (slew rate).

To maintain the engine fuel at a minimum system pressure, a minimum pressurizing valve is positioned downstream of the fuel metering valve in the engine fuel supply path. The minimum pressurizing valve receives the engine fuel flow as an input and is mechanically biased to close at the desired minimum pressure. Therefore, the pressure of the engine fuel flow must be greater than the desired minimum pressure in order to force the minimum pressurizing valve open thus allowing the flow of fuel to the engine.

Higher system pressures increase internal leakage of fuel system components and reduce the volumetric efficiency of the pump thus also increasing pump size.

DISCLOSURE OF INVENTION

An object of the present invention is to reduce the minimum required pump size for starting a turbine engine by reducing the system pressure level during engine start to thereby increase the volumetric efficiency of the fuel pump.

A further object of the present invention is to reduce the minimum required pump size for starting a turbine engine by reducing internal leakage of fuel system components by reducing the system operating pressure during engine start.

A further object of the present invention is to reduce fuel heating by reducing the amount of fuel bypassed during flight mode by minimizing the pump displacement required for proper engine operation.

According to the present invention a fuel delivery system comprises bi-level hydraulic pressure setting valve which maintains the engine fuel pressure at one of two pressures settings. A first pressure setting (start pressure) is maintained during engine start and a second pressure setting (normal pressure) is maintained for all other engine modes, when operating on the minimum pressurizing valve.

The start pressure is determined by the minimum pressure required to provide adequate force margins for valves in the fuel control. This is the minimum pressure required to position the valves in the fuel control for engine start.

The normal pressure is determined by the minimum pressure required to provide proper performance (i.e. slew rate or transfer times) of valves within the fuel control.

In a fuel delivery system having a fuel pump for pressurizing fuel and a metering valve for regulating the amount of fuel delivered to an engine a bi-level hydraulic pressure setting valve preferably comprises a pressure regulating valve and associated orifices and a minimum pressurizing valve. The pressure regulating valve controls the pressure differential across the fuel metering valve and controls the input of a pressure signal to the backside of the minimum pressurizing valve. The minimum pressurizing valve ensures that the minimum fuel system pressure level is maintained.

Fuel is supplied to the metering valve by a fixed displacement pump whose output increases with pump speed. The pressure regulating valve controls the pressure drop across the metering valve to a desired value by bypassing excess fuel from the metering valve input to the fixed displacement pump input. Prior to engine start, or lightoff, the pressure regulating valve is closed such that no fuel is bypassed and the minimum pressurizing valve is initially biased closed by a spring.

During the engine start, fuel pressure builds and the minimum pressurizing valve opens allowing fuel to flow to the engine. The spring is selected such that the minimum pressurizing valve will open when the fuel pressure is sufficient to overcome the force margins necessary to activate the valves within the fuel control allowing the valves within the fuel control to be positioned for engine start.

In a first embodiment of the present invention, as the flow and pressure of the fuel increase, the pressure regulating valve will begin to bypass fuel. This bypassing and associated valve movement opens the pressure signal port to the backside of the minimum pressurizing valve. The pressure signal and associated orifices control the increase in the minimum pressure level between start and normal operation.

In a second embodiment of the present invention, the output flow of the pump is measured by a flow meter. The metered flow is calculated using an LVDT to measure the area of the metering window and the pressure drop across the window which is a maintained at a known value by the pressure regulating valve. The metered flow rate is then compared to the output flow rate to determine the presence of excess flow. As in the first embodiment a pressure signal is ported to the backside of the minimum pressurizing valve. The pressure signal and associated orifices control the increase in the minimum pressure level between start and normal operation.

In a third embodiment of the present invention the flow rate of the excess or bypass flow is measured directly by a flow meter in the bypass fuel line.

In a fourth embodiment of the present invention a pressure switch is positioned in the pump output line. The pressure switch provides a signal to the backside of the minimum pressurization valve as in the previous embodiments. The pressure switch is designed to provide a signal to minimum pressurization valve for a pump output flow which corresponds to a desired excess flow of fuel.

A first orifice is located upstream of the minimum pressurizing valve and a second orifice is located downstream of the minimum pressurizing valve. The pressure regulating valve, when bypassing, supplies a pressure/flow source which flows through these orifices resulting in an increase in the minimum pressurizing valve opening pressure. The increase in the minimum pressurizing valve opening pressure causes the fuel system pressure to increase to the minimum level required for proper operating performance of the fuel control valves.

Figure 1:
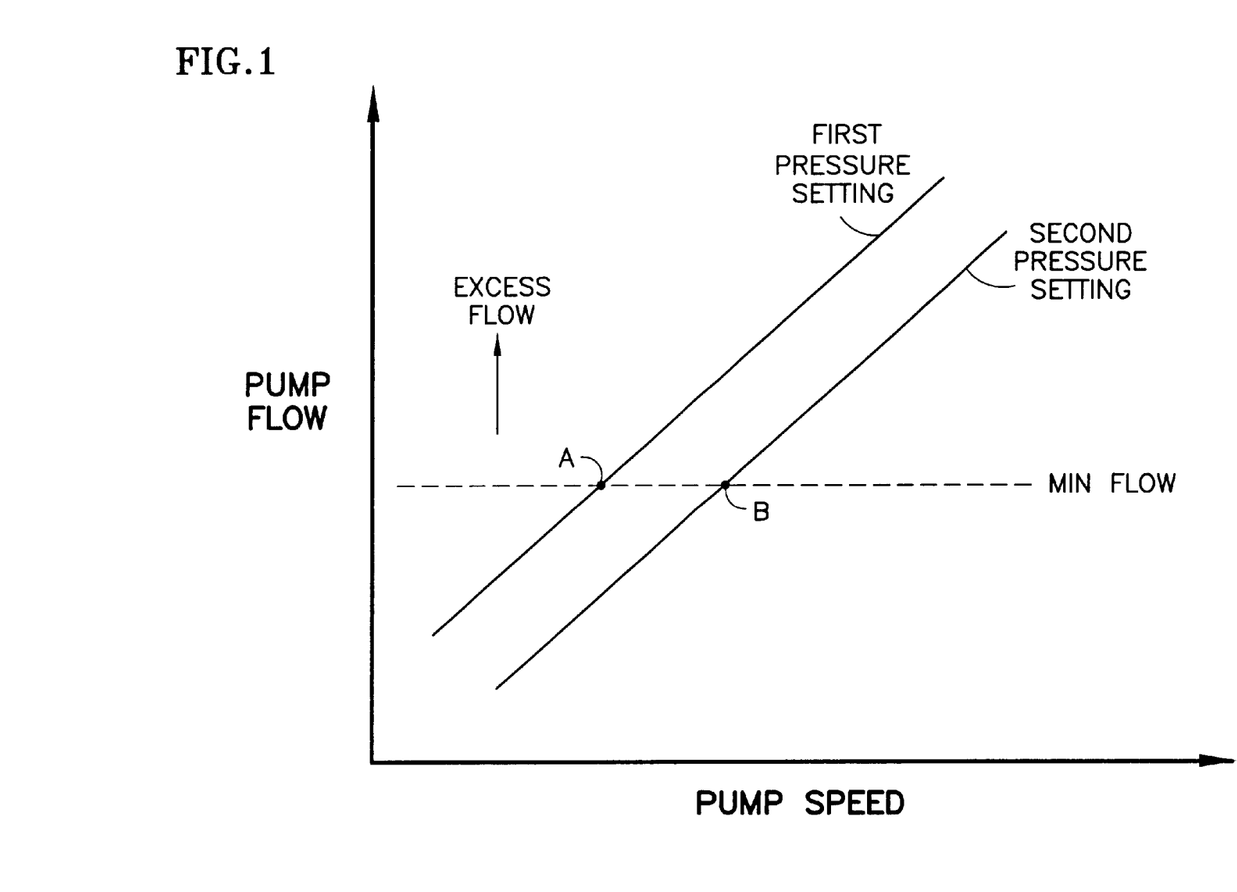
FIG. 1 is a graph of pump output flow vs. pump speed.

The relationship of pump flow and pump speed is shown in FIG. 1. The output of the pump is essentially linear for increases with pump speed. Lines 10, and 12 show pump output flow versus speed for a first and second minimum pressure respectively. The first pressure is selected to overcome the force margins of the valves in the fuel control. The second pressure corresponds to the minimum pressure to dynamically operate the valves.

Point A corresponds to the minimum flow that will produce sufficient pressure to open the minimum pressurization valve and permit flow of fuel to the engine for lightoff. Point B corresponds to flow fuel in excess of the minimum and therefore fuel may be bypassed from the metering valve to the pump inlet. When sufficient excess flow is present the minimum pressure may be increased causing the pump to operate on Line 12.

The present invention has the utility of reducing the minimum required pump size for starting a turbine engine by reducing the system pressure setting during engine start.

The present invention also has the utility of increasing the volumetric efficiency of the fuel pump by reducing the operating pressure of the pump upon engine start.

The present invention also has the utility of reducing internal leakage of fuel system components by reducing the system operating pressure at engine start.

The present invention also has the utility of reducing fuel heating by reducing the amount of fuel bypassed during flight mode by reducing the pump requirements for engine startup.

BEST MODE FOR CARRYING OUT THE INVENTION

Figure 2:
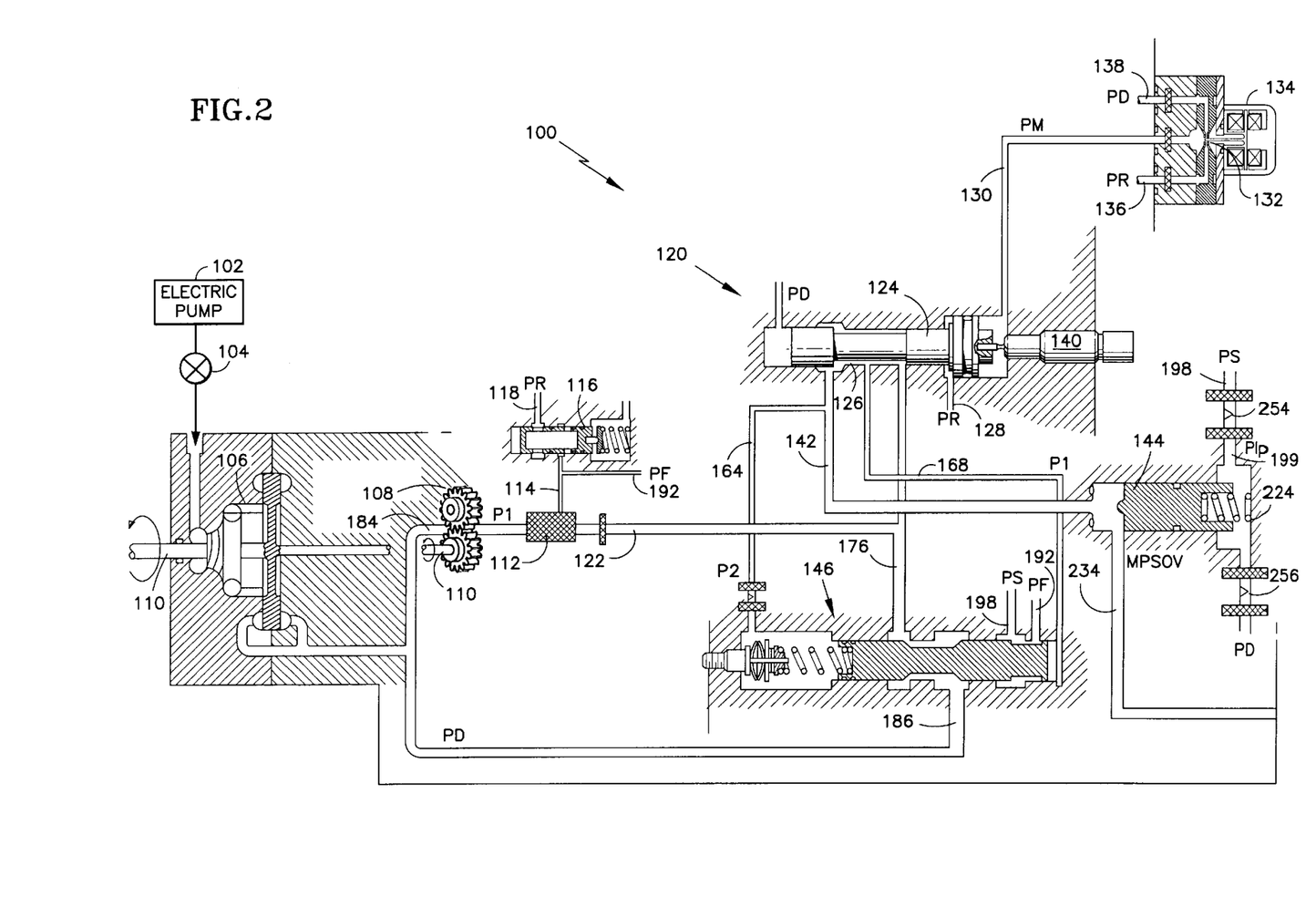
FIG. 2 is a schematic view of a fuel delivery system in accordance with the a first embodiment of the present invention.

Referring to FIG. 2, there illustrated is a fuel delivery system 100, preferably for an aircraft engine, according to the present invention. Upon startup or lightoff an electric pump 102 supplies fuel through a solenoid valve 104 to an inducer/boost pump 106 which in turn supplies fuel to the inlet of the positive displacement pump 108. The solenoid valve 104 and electric pump 102 are controlled by the aircraft pilot.

The positive displacement pump 108, is driven by a shaft 110 which in turn is driven by the engine (not shown). Therefore, the amount of fuel delivered by pump 108 is a function of engine speed.

The output of the positive displacement pump 108 is input to a fine screen filter 112 which filters out impurities from the fuel. A portion of the filtered fuel (PF) is delivered through line 114 to a servo pressure regulator 116. The servo pressure regulator produces regulated pressure (PR) on line 118 used for positioning the metering valve 120. PR is at a higher pressure than the pump interstage pressure (PD) which is the pressure at the inlet 184 of positive displacement pump 108. PR and PF are two of the pressure sources used to position valves within the fuel delivery system 100.

The majority of the fuel is delivered via fuel line 122 to either the metering valve 120 or the pressure regulating/pressure setting valve (PRV) 146. The metering valve controls the flow of fuel to the engine by positioning spool 124 which in turn controls the area of the metering valve window 126.

The position of the spool 124 is maintained by two counter balancing pressures, PR on line 128, and the modulated pressure (PM) input on line 130. The PM on line 130 is controlled by a flapper valve 132 which is positioned by a torque motor 134 in response to a signal from the electronic engine control (EEC not shown). PM is proportional to PR on line 136 and PD on line 138.

The EEC sets the desired metering valve 120 position to achieve a desired engine operating condition. Feedback on the position of spool 124 position is provided by an LVDT 140 which is monitored by the EEC. The output of the metering valve 120 is delivered to the minimum pressurizing valve 144 on line 142. The minimum pressurizing valve 144 sets the inlet pressure of the fuel to be delivered to the fuel control from the positive displacement pump 108. The function of the minimum pressurizing valve 144 will be described in greater detail herein.

The flow through the metering valve is proportional to the area of the metering valve window 126 multiplied by the square root of the product of the pressure differential across the metering valve window 126 and the specific gravity of the fuel. Therefore, in order for the metering valve 120 to precisely control the flow of fuel to the engine by varying the area of the metering window 126 the pressure drop across the metering valve 120 must be held at a constant set point. The pressure drop across the metering valve 120 is controlled by the pressure regulating pressure setting valve (PRV) 146.

Figure 3:
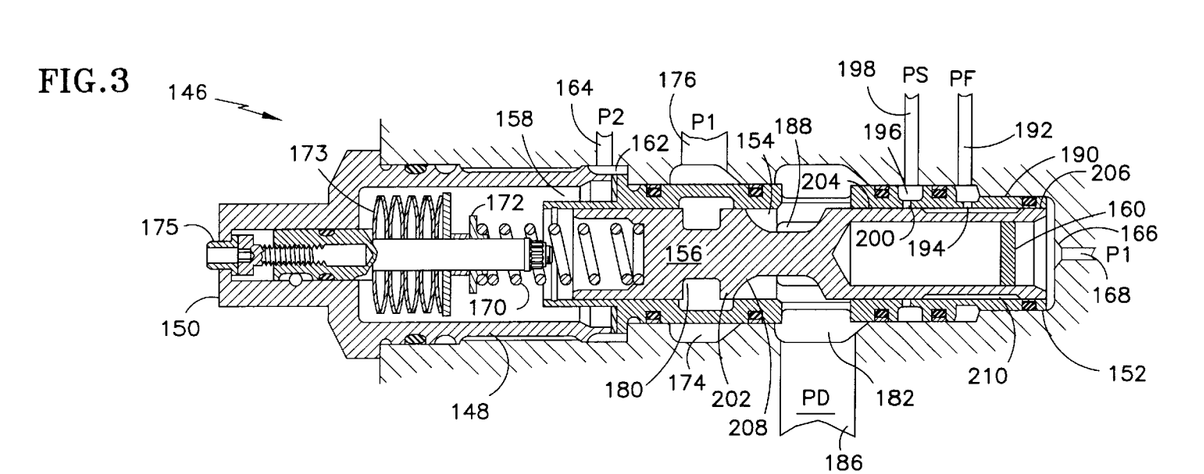
FIG. 3 is a cross-sectional view of the pressure regulating/pressure setting valve with pressure setting function during engine start.

The PRV 146 is shown in greater detail in FIG. 3. The PRV 146 consists of a housing 148 having a first end 150 and second end 152 and having a cavity 154 disposed through its length. Slidably located within the cavity 154 is a spool 156 having a low pressure end 158 and high pressure end 160.

Located at the first end 150 of the housing 148 is a port 162 for sensing the metered pressure (P2) of the metered flow on line 164. Located at a second end 152 of the housing is a second port 166 for sensing pressure (P1) of the positive displacement pump output flow on line 168. The positive displacement pump output pressure (P1) acts upon the high pressure end 160 of spool 156. The pressure differential across metering valve 120 is equal to the difference between P1 and P2.

Spring 170 is located within cavity 154 acting upon first end 158 of spool 156. The spring 170 sets the pressure differential to be maintained across the metering valve 120. The spring 170 has sufficient force to hold the spool 156 in a closed position, upon startup or lightoff of the engine as shown in FIG. 3. Adjustment screw 175 allows for manual adjustment of the differential pressure to be maintained across the metering valve 120. The spring 170 is located relative to the housing by spring seat 172.

Bi-metallic discs 173 act upon the spring seat 172. The bi-metallic discs 173 expand as the temperature of the fuel increases thus increasing the pressure differential setting across the metering valve. This expansion is needed for this temperature change because the flow through the metering window 126 of valve 120 is proportional to the area of the metering window 126 multiplied by the square root of the product of the pressure drop across the metering window 126 multiplied by the specific gravity of the fuel. The specific gravity of the fuel decreases as the temperature of the fuel increases. Therefore, the pressure differential must be increased for decreases in specific gravity in order to have the expected fuel flow for a given metering window 126 area.

There are four ports located along the length of the housing 148 in fluid communication with the cavity 154. The first port 174 receives flow from the output of the positive displacement pump 108 along line 176 and is connected to cavity 154 through first window 180. The second port 182 is an output for providing bypass flow to the inlet 184 of the positive displacement pump 108 along line 186 and is connected to cavity 154 through second window 188. The third port 190 is an input for receiving PF along line 192 and is connected to cavity 154 through third window 194. The fourth port 196 is an output for providing pressure signal (PS) on line 198 to the minimum pressurizing valve 144. The fourth port 196 is connected to cavity 154 through fourth window 200.

The spool 156 has a first land 202, a second land 204 and a third land 206. A first recess 208 separates the first 202 and second 204 lands, and a second recess 210 separates the second 204 and third 206 lands, with the second land 204 being disposed between the first 202 and third 206 lands.

FIG. 3 also shows the PRV 146 in a first, closed position for a condition where there is no excess flow. In this position the force exerted by P1 through line 168 on the high pressure end 160 of the spool 156 is less than the combined force of the spring 170, bi-metallic discs 173, and P2 exerted on the low pressure end 158 of the spool 156. In this position the first land 202 is disposed between the first window 180 and the second window 188 preventing bypass flow to the pump high pressure inlet 184 through line 186. The second land 204 is positioned between the third window 194 and the fourth window 200 preventing PS flow to the low pressure end 224 of the minimum pressurizing valve 144, as shown in FIG. 5.

Figure 4:
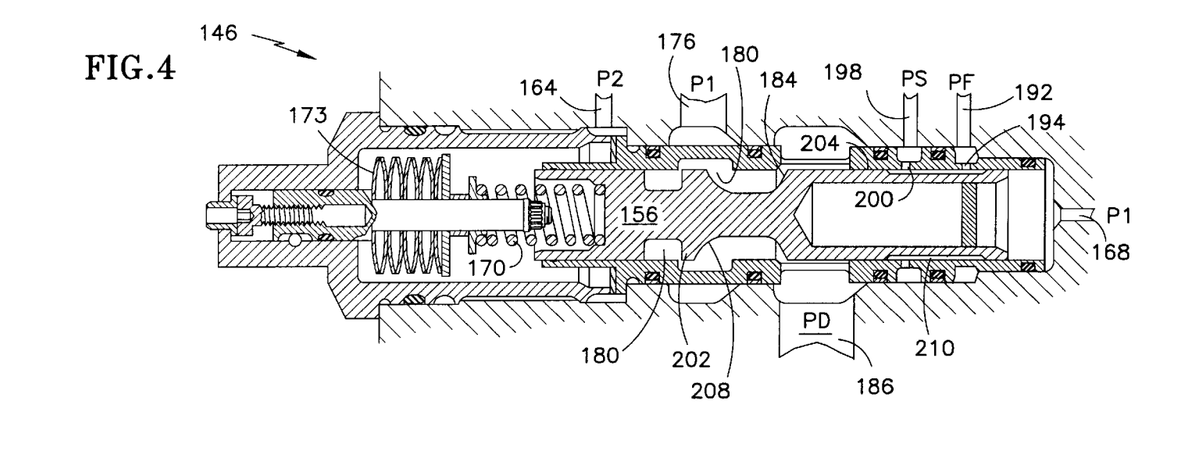
FIG. 4 is a cross-sectional view of the pressure regulating/pressure setting valve with pressure setting function during normal engine operation.

As the speed of the positive displacement pump 108 increases, the pump output flow increases creating excess flow and causing pressure P1 to increase such that it is greater than the combined force of P2, spring 170 and bi-metallic discs 173 causing the spool 156 to transition to the left as shown in FIG. 4. The first land 202 is now positioned such that first window 180 is now in fluid communication with second window 188 through first recess 208 allowing excess flow to the high pressure pump inlet 184. As the excess fuel is bypassed the pressure differential across the metering valve 120 will return to the desired set point and the pressure acting upon spool 156 will be balanced.

Figure 5:
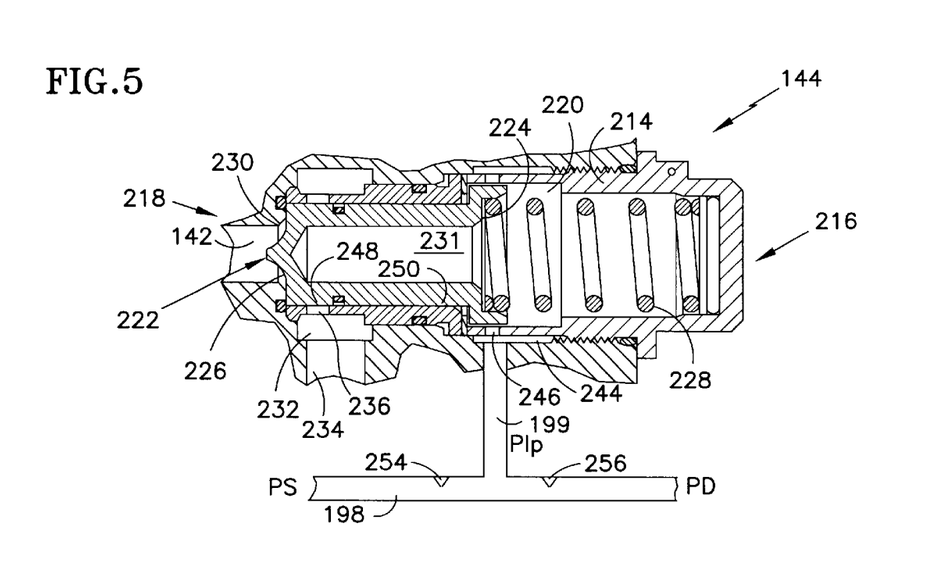
FIG. 5 is a cross-sectional view of the minimum pressurizing valve prior to engine start.
Figure 6:
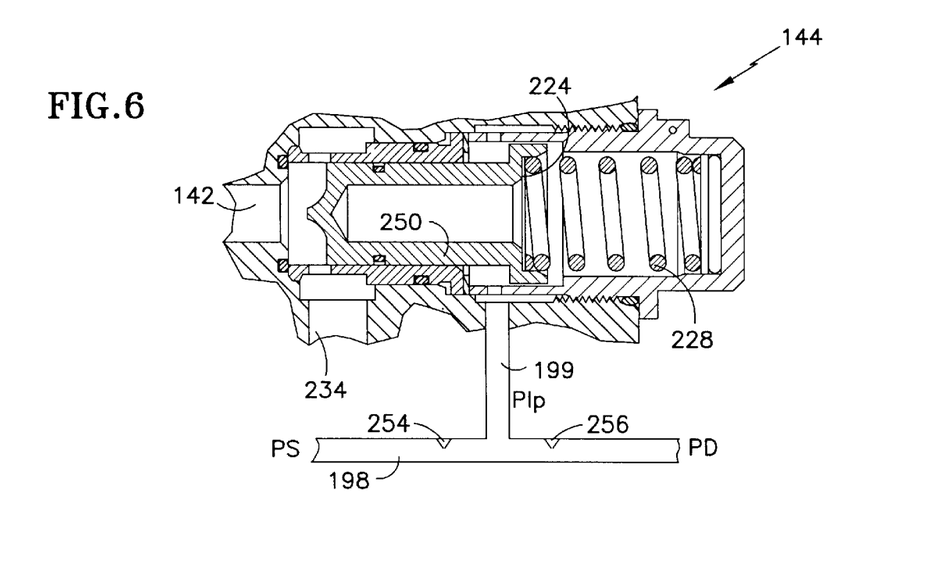
FIG. 6 is a cross-sectional view of the minimum pressurizing valve during normal operation.

As the spool 156 (FIG. 4) travels toward the left, the second land 204 is positioned such that the third window 194 and fourth window 200 are in fluid communication allowing PS to communicate with the low pressure end 224 of minimum pressurizing valve 144 as shown in FIG. 5.

The spool and windows of the PRV 146 may be arranged such that the pressure at which fuel is bypassed and the pressure at which PS is ported to the low pressure end 224 of the minimum pressurizing valve 144 may be the same or different.

As the speed of the positive displacement pump 108 decreases, the process described in the preceding paragraphs is reversed.

The minimum pressurizing valve 144 is shown in greater detail in FIG. 5. The minimum pressurizing valve 144 shown in the closed position, consists of a housing 214 having a first end 216 and second end 218 and having a cavity 220 disposed through its length. Slidably located within the cavity 220 is a spool 222 having a low pressure end 224 and high pressure end 226. The spool 222 also has a drilled passage 231 to reduce weight.

Located at the first end 216 of the housing 214 is a spring 228. The spring 228 acts upon the low pressure end 224 of the spool 222. Located at a second end 218 of the housing is a regulated fuel inlet 230 for receiving the metered flow from the metering valve 120 through line 142. The regulated fuel acts on the high pressure end 226 of the spool 222.

There are two ports located along the length of the housing 214 in fluid communication with the cavity 220. The first port 232 is an output to the engine (not shown) along line 234 and is connected to cavity 220 through first window 236. The second port 244 is an input for receiving Plp through line 199 and is connected to cavity 220 through third window 246.

A first orifice 254 is located between the PS 198 and second port 244 and second orifice 256 is located between the second port 244 and PD which is the same pressure as the positive displacement pump inlet 184. The positive displacement pump 108 outlet pressure is a function of 1) pressure drop across the metering valve 120; 2) minimum pressurizing valve spring 228; 3) minimum pressurizing valve 144 cross sectional area; and 4) the ratio of first orifice 254 and the second orifice 256. The following equation provides a method for calculating the positive displacement pump 108 outlet pressure (P1):

$$P1 = (MVDP = Fs/Av)/(1-1/(1+(D2^2/D1^2)^2)$$

Where,

P1 is the positive displacement pump 108 outlet pressure (psid) over drain pressure MVDP is the metering valve 120 pressure drop (psid)

Fs is the minimum pressurizing valve 144 spring force (lbs)

Av is the minimum pressurizing valve 144 cross-sectional area (in$^2$)

D1 is the diameter of the first orifice 254 (in)

D2 is the diameter of the second orifice 256 (in)

As stated previously, PF and PR are derived from the output of the positive displacement pump 108 and are used for positioning valves within the fuel delivery system 100.

In operation, the minimum pressurizing valve 144 acts in concert with the PRV 146 to regulate the pressure of the metered fuel flow to the engine. As discussed in the preceding paragraphs, upon engine start the pressure drop across the metering valve 126 is relatively low therefore the pressure at the high pressure end 160 of the PRV 146 is less than the force exerted by the spring 170 and bi-metallic disc 173 and P2. This causes the spool 156 to be positioned as shown in FIG. 3 preventing PS from flowing to the low pressure end 224 of the minimum pressurizing valve 144.

Therefore, the pressure of the metered fuel needed to force the spool 222 to the open position as shown in FIG. 5 must be greater than the pressure exerted by the spring 228 and Plp thus maintaining the regulated fuel at the pressure as determined by the spring force of the spring 228 and Plp. As discussed, this pressure is selected to be the minimum needed to position the valves in the fuel control for engine start.

As the engine speed increases, the shaft 110 speed increases which increases the output of the fixed displacement pump 108 increasing the output flow of the pump 110. This in turn increases the pressure differential across the metering valve 126. The pressure P1 at the high pressure end 160 of the PRV 146 is greater than the force exerted by the spring 170 and the bi-metallic disc 173 and P2 on the low pressure end 158 of the PRV 146 causing the spool 156 to translate to the position shown in FIG. 4. In this position the PRV 146 begins to bypass excess flow and allows PS to flow, through line 198, to the low pressure end 224 of the minimum pressurizing valve 144. Thus, the pressure at the low pressure end 224 is now determined by Plp and spring 228.

Metered fuel flow delivered to the minimum pressurizing valve 144 from the metering valve 120 on line 142 must now have a pressure greater than the combined force of the spring 228 and Plp input through second port 224, thus maintaining the pressure of the metered fuel flow at a higher minimum pressure. This minimum pressure is selected to meet the slew rate requirements of the valves in the fuel control to allow for normal operation of the engine.

In the preferred embodiment, as shown in FIG. 2, the pressure signal to the minimum pressurization valve is controlled by the position of the PRV 146 spool 156 which senses the excess flow of fuel as determined by measuring the pressure of the pump output flow and the pressure of the metered flow. The excess flow is a function of the total flow and metered flow.

Figure 7:
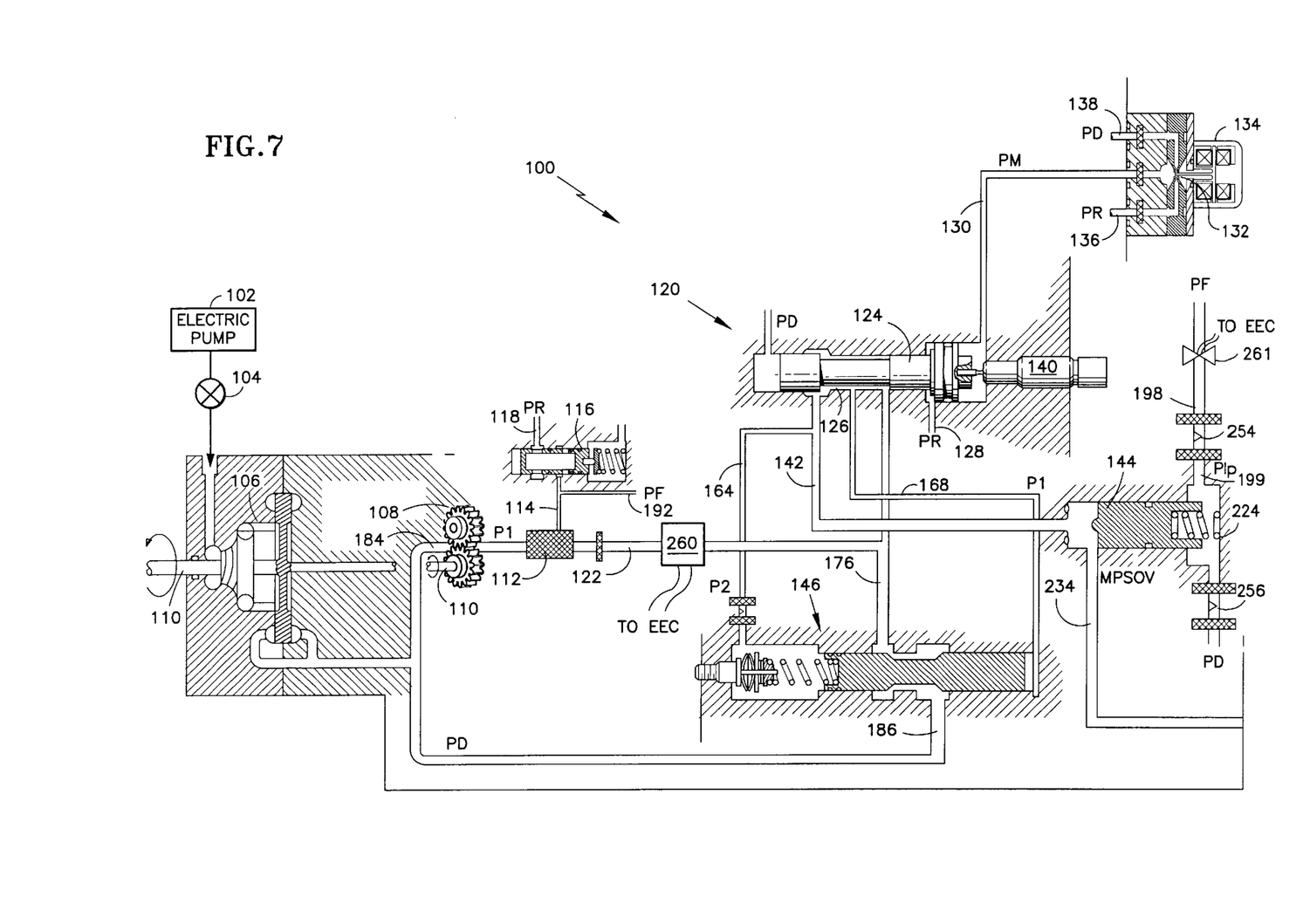
FIG. 7 is a schematic view of a fuel delivery system in accordance with the a second embodiment of the present invention.

In a second embodiment of the present invention, as shown in FIG. 7, the excess flow is determined by the EEC. The flow rate of the pump output is provided to the EEC by the flow meter 260. The output flow of the metering valve is determined by the EEC based on the area of the metering valve window 126 as measured by the LVDT 140 and the pressure drop across the metering valve which is maintained at a constant known value by the PRV 146. Since flow through metering valve 12 is equal to a constant multiplied by the area of the metering valve window 120 multiplied by the square root of the pressure, excess flow is then calculated by subtracting the calculated metered flow from the measured pump output flow.

When the proper amount of excess flow is detected, the EEC energizes solenoid valve 261 placing Pf in fluid communication with the low pressure end 224 of the minimum pressurizing valve 144. The operation of the minimum pressurization valve 144 is the same as in the first embodiment.

In a third embodiment(not shown) the flow meter 260 or a flow switch is positioned in line 186 to directly measure bypass flow. Upon detection of the proper amount of excess or bypass flow, the EEC energizes solenoid 261 placing Pf in fluid communication with the low pressure end 224 of the minimum pressurization valve 144.

Figure 8:
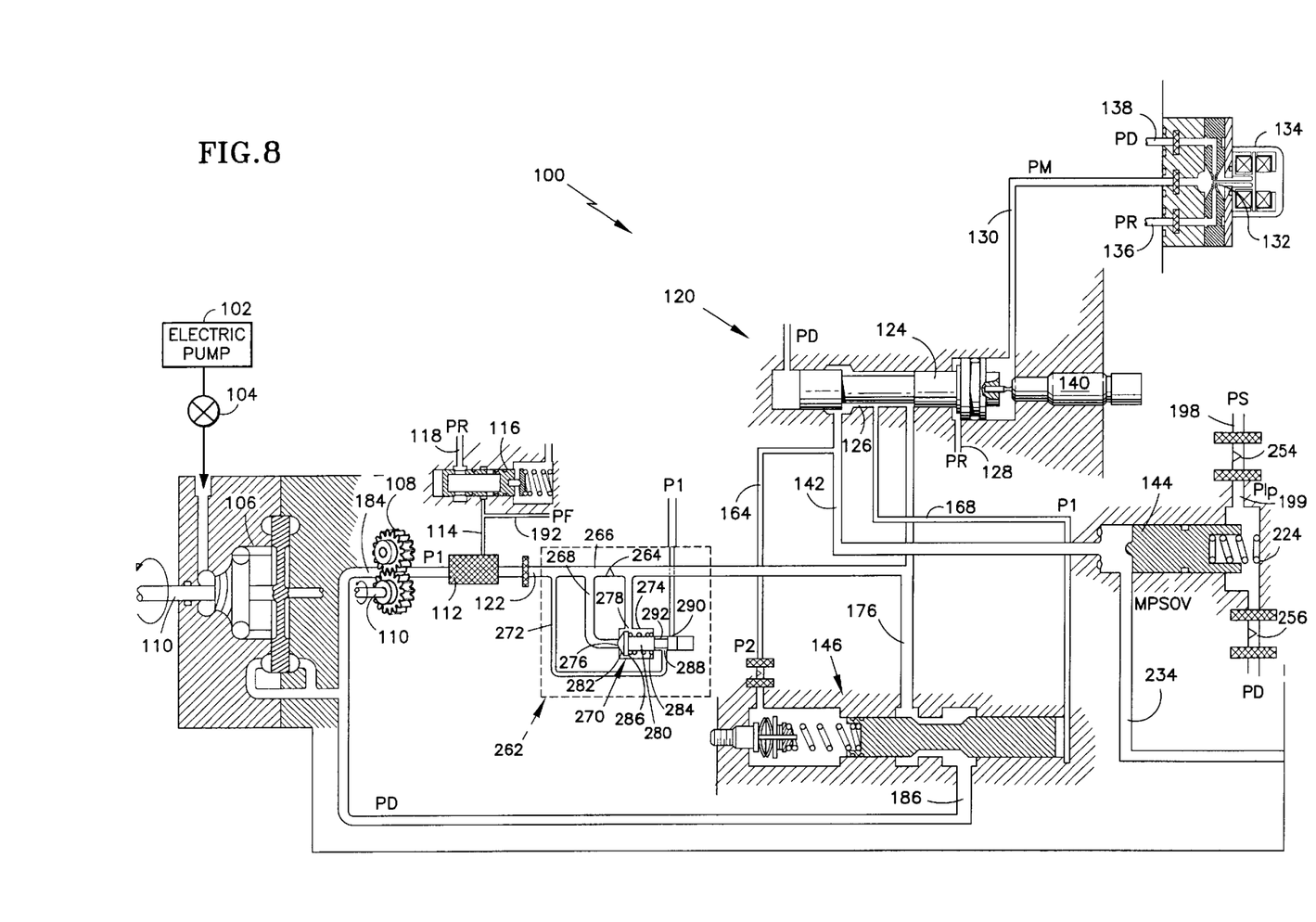
FIG. 8 is a schematic view of a fuel delivery system in accordance with the a fourth embodiment of the present invention with the pressure setting valve in the closed position; and, FIG. 9 is a schematic view of a fuel delivery system in accordance with the a fourth embodiment of the present invention with the pressure setting valve in the open position.

A fourth embodiment of the subject invention is shown in FIG. 8. A pressure setting valve (PSV) 262 is disposed in fuel line 122 between pump 108 and metering valve 120. The PSV 262 consists of an orifice 264 disposed in a fuel line 266, second fuel line 268, a pressure switch 270 for sensing the pressure drop across orifice 264, and a pressure sensing line 272.

The pressure switch 270 includes a housing 274 consisting of a first port 276 in fluid communication with line 266 on the pump 108 side of orifice 264 and a second port 278 in fluid communication with line 266 on the minimum pressurization valve 144 side of orifice 264. A spool 280 is positioned within housing 274. A first end 282 of spool 280 is exposed to pump 108 output flow. A spring 284 is positioned within housing 274 and exerts a force on a second end 286 of spool 280 which opposes the force exerted on first end 282 by the pump output flow.

A third and fourth port 288, 290 are located along the length of valve housing 274. The third port 288 is in fluid communication with pressure sensing line 272 and fourth port 290 is in fluid communication with line 198 of the minimum pressurizing valve 144. A window 292 is disposed in spool 280 for selectively placing third port 288 in fluid communication with fourth port 290.

In operation, upon start up the pressure switch 270 is in a closed position with spool 280 preventing fluid communication between the first and second ports 276, 278, and between the third and fourth ports 288, 290.

Figure 9:
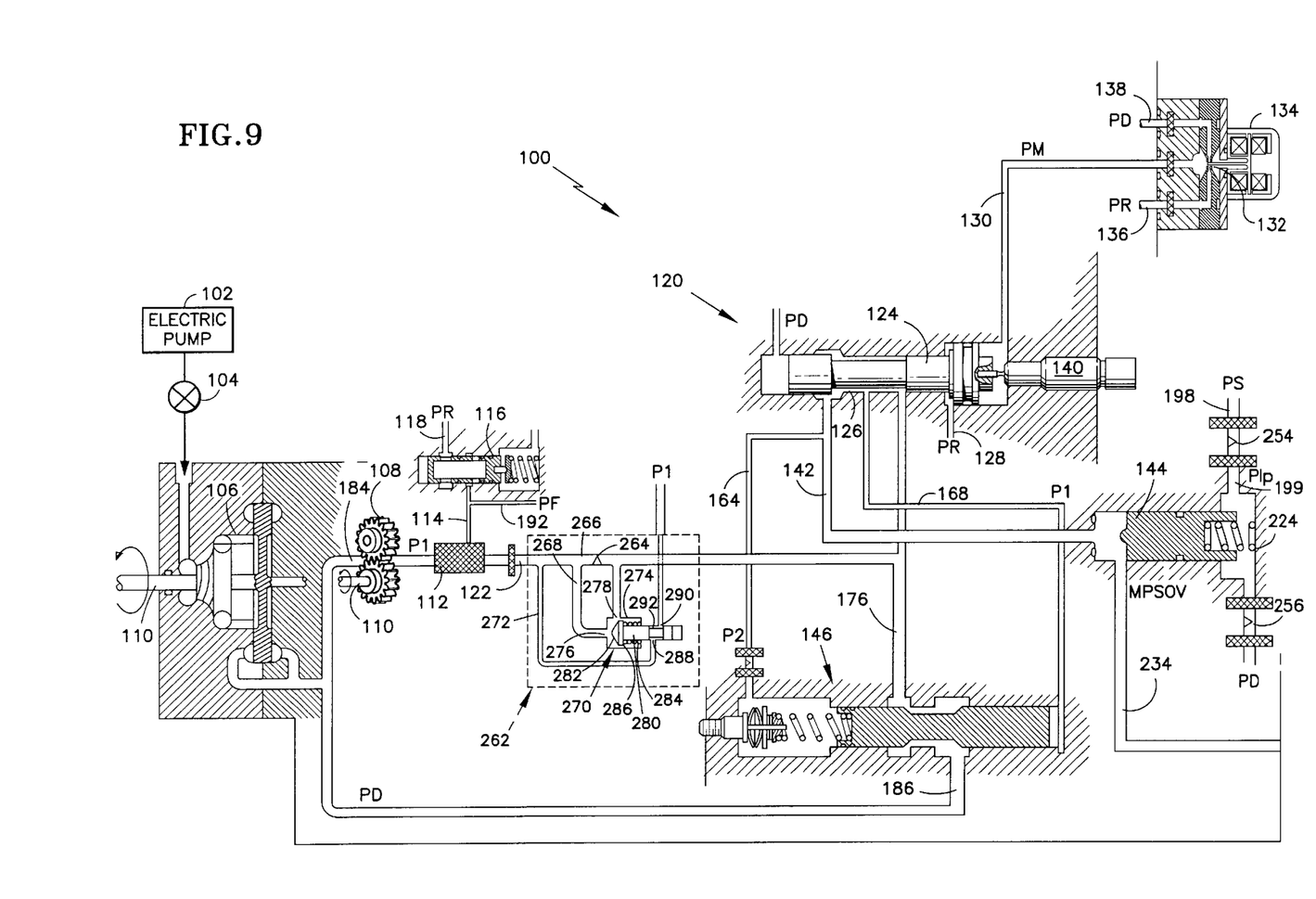

As the output flow from pump 108 increases, the pressure drop across orifice 264, as sensed by pressure switch 270 increases. At a predetermined flow, the pressure at first end 282 overcomes the force exerted by spring 284 on the second 286 and the spool 280 transitions to the right as shown in FIG. 9.

In the open position first port 276 is placed in fluid communication with second port 278 and third port 288 is placed in fluid communication with fourth port 290 placing pump output pressure in fluid communication with first end 216 of the minimum pressurization valve 144. The operation of the minimum pressurization is the same as in the previous embodiments.

In the fourth embodiment the pressure at which pressure switch 144 opens is a function of total pump flow and is set to coincide with the occurrence of excess or bypass flow.

It should be understood by those skilled in the art that obvious structural modifications can be made without departing from the spirit of the invention. Accordingly, reference should be made primarily to the accompanying claims, rather than the foregoing specification, to determine the scope of the invention.

The present invention has the utility of reducing the minimum required pump size for starting a turbine engine by reducing the system pressure setting during engine start.

The present invention also has the utility of increasing the volumetric efficiency of the fuel pump by reducing the operating pressure of the pump upon engine start.

The present invention also has the utility of reducing internal leakage of fuel system components by reducing the system operating pressure at engine start.

The present invention also has the utility of reducing fuel heating by reducing the amount of fuel bypassed during flight mode by reducing the pump requirements for engine startup.

We claim:

1. A bi-level hydraulic pressurization system for regulating a fluid output pressure comprising:
    a metering valve in fluid communication with an input flow of fuel at a fluid input pressure for regulating said input flow of fuel to produce a metered flow of fuel;
    a metering valve window within said metering valve, wherein said metered flow of fuel is controlled by the area of said metering valve window and the pressure drop across said metering valve;
    a pressure regulating valve in fluid communication with said input flow of fuel and said metered flow of fuel for regulating the pressure drop across said metering valve, wherein said pressure regulating valve provides a signal when said fluid input pressure is greater than a first value; and
    a pressurizing means for controlling a fluid output pressure of said metered flow of fuel responsive to said signal for regulating said fluid output pressure to a first minimum pressure when said fluid input pressure is less than said first value and for regulating said fluid output pressure to a second minimum pressure when said fluid input pressure is greater than said first value.

2. The bi-level hydraulic pressurization means of claim 1 wherein said pressurizing means further comprises a biasing means for setting said first and said second minimum pressures.

3. The pressurizing means of claim 2 wherein said biasing means comprises a spring for setting said first minimum pressure.

4. The pressurizing means of claim 3 wherein said biasing means further comprises a means for responding to said signal for setting said second minimum pressure.

* * * * *